A. LOPES.
NUTCRACKER.
APPLICATION FILED FEB. 27, 1920.
1,370,137.
Patented Mar. 1, 1921.
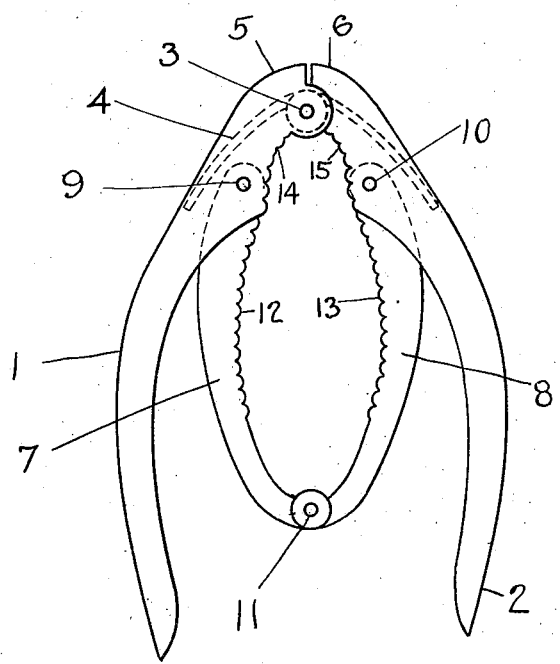
INVENTOR
ANTONIO LOPES
BY
Wm Wallace White
ATTORNEY

UNITED STATES PATENT OFFICE.

ANTONIO LOPES, OF LISBON, PORTUGAL, ASSIGNOR TO ANTONIO DE ALMEIDA BELLO, OF LISBON, PORTUGAL.

NUTCRACKER.

1,370,137. Specification of Letters Patent. Patented Mar. 1, 1921.

Application filed February 27, 1920. Serial No. 361,668.

*To all whom it may concern:*

Be it known that I, ANTONIO LOPES, a citizen of Portugal, residing at Lisbon, Portugal, have invented new and useful Improvements in Nutcrackers, of which the following is a specificatiton.

An object of this invention is to provide a nut cracker in which the power exerted by the hand of the person using it is greatly multiplied, but maintained easily under control. A further object is to provide means for applying power to crack a nut and at the same time holding the nut within the palm of the hand, thus preventing the flying of pieces of shell.

In the accompanying drawing I have shown a preferred embodiment of my invention. The figure shows a nut cracker in elevation.

Referring to the drawing, the nut cracker comprises a pair of handles 1 and 2, pivotally secured together by a pin 3. These arms are preferably of channel construction, and are normally held apart by means of a spring 4 disposed in the channel portion and held in place preferably by the pin 3. In order to limit the separation of the handles to an amount convenient to the hand, abutments 5 and 6 may be formed on the handles beyond the pin 3, which are normally held in contact with each other by the spring 4.

Pivotally secured to the handles 1 and 2 are the nut engaging members or jaws 7 and 8, the member 7 being pivoted to the handle 1 by a pin 9 and the member 8 to the handle 2 by a pin 10. These members 7 and 8 are pivoted together near their other ends by a pin 11, and are preferably provided with roughened surfaces 12 and 13 for engaging the nuts. If the nuts are small, as for instance in the case of almonds, they may be cracked between roughened surfaces 14 and 15 on the handle members.

The nut cracker is used by grasping it in the hand, inserting a nut between the jaws 7 and 8, and applying pressure to the handles. The handles act as levers fulcrumed at the pin 10, and thus apply a multiplied force at the pins 9 and 10 to the ends of the jaws, which likewise act as levers, the fulcrum being the pin 11, and exert a still further multiplied force on the nut, the while permitting the nut to be inclosed by the hand to prevent the scattering of shells, and permitting the force exerted to be applied gradually, and without fear of the nut slipping from the jaws with consequent danger of pinching the hand.

Having now described my invention, I claim and desire to secure by Letters Patent:

A nut cracker comprising a pair of handle members of channel form pivoted together, a pair of jaw members pivoted together, the free ends of said jaws being pivotally connected with said handles, and the said handle members having supplementary jaw portions for small easily broken nuts disposed on the channel edges between the pivot of the handle members and the points of attachment of the jaw members with the handle members, and a flat spring disposed within the channel handles and held in place by the pivot thereof to keep said jaws normally apart.

In testimony whereof I have signed my name to this specification.

ANTONIO $\overset{\text{his}}{\times}$ LOPES.
$\phantom{ANTONIO\ }{}^{\text{mark}}$ Witnesses:
MACHADO DA CRUZ,
JACHYNTHO DA CUNHO SAMPO.